Patented Feb. 4, 1941

2,230,812

UNITED STATES PATENT OFFICE 2,230,812

PROCESS OF RECOVERING PHENOLS FROM RESINS OF PHENOLS AND ALDEHYDES

Mathias Pier, Heidelberg, and Walter Simon and Georg Grassl, Ludwigshafen-on-the-Rhine, Germany, assignors, by mesne assignments, to General Aniline & Film Corporation, New York, N. Y., a corporation of Delaware No Drawing. Application September 24, 1938, Serial No. 231,522. In Germany September 25, 1937

3 Claims. (Cl. 260—627)

The present invention relates to a process of recovering phenols from resins of phenols and aldehydes.

We have found that phenols, i. e., phenol and its homologues, such as cresols or xylenols, can be recovered from resins of phenols and aldehydes by treating the resins under pressure with organic solvents above 300° C.

As initial materials there may be mentioned in particular waste of phenol or cresol resins from pressing works. They are preferably used in a comminuted state.

As suitable organic solvents there may be mentioned especially hydrogenated cyclic hydrocarbons or mixtures containing the same, for example hydrogenated naphthalenes or middle oils or heavy benzines, advantageously those obtained by the destructive hydrogenation of mineral coal. Other solvents, such as dioxane or anthracene oils can also be employed.

By heating a mixture of phenol resins with the said solvents under a pressure of from about 20 to 200 atmospheres, there occurs a splitting up of the resin above 300° C. It is preferable to heat the mixtures to from 350° to 500° C. for from about 2 to 6 hours.

The reaction material is then filtered or centrifuged. The phenols are recovered from the filtrate in known manner, for example by washing out with sodium hydroxide solution.

The following example will further illustrate how this invention may be carried out in practice but the invention is not restricted to this example. The parts are by weight.

Example 800 parts of waste of synthetic resins from a commercial cresol and formaldehyde are heated with 1200 parts of tetrahydronaphthalene under a pressure of nitrogen of from 110 to 120 atmospheres for three hours at 405° C. The reaction product is filtered and shaken with sodium hydroxide solution. 306 parts of a mixture are thus obtained from which by distillation after acidification there are recovered about 2.7 per cent of phenol, 39.2 per cent of ortho-cresol, 43.0 per cent of para- and meta-cresol and 15.1 per cent of xylenols.

From 800 parts of a resin of technical cresol and xylenol there were obtained after the same treatment 375 parts of a mixture, which yielded when distilled 2.4 per cent of phenol, 34.4 per cent of ortho-cresol, 37.7 per cent of para- and meta-cresol, 13.3 per cent of xylenol and 12.2 per cent of higher phenols.

What we claim is:

1. A process for recovering phenols from resins of phenols and aldehydes which comprises treating said resins under a pressure of from about 20 to about 200 atmospheres with hydrogenated cyclic hydrocarbons at from 300° to 500° C.

2. A process for recovering phenols from resins of phenols and aldehydes which comprises treating said resins under a pressure of from about 20 to about 200 atmospheres with hydrocarbon mixtures containing hydrogenated cyclic hydrocarbons at from 300° to 500° C.

3. A process for recovering phenols from resins of phenols and aldehydes which comprises treating said resins under a pressure of from about 20 to about 200 atmospheres with tetrahydronaphthalene at from 300° to 500° C.

MATHIAS PIER.
WALTER SIMON.
GEORG GRASSL.